(12) United States Patent
Ohno

(10) Patent No.: US 10,882,489 B2
(45) Date of Patent: Jan. 5, 2021

(54) VEHICLE SEATBELT DEVICE

(71) Applicant: TOYOTA JIDOSHA KABUSHIKI KAISHA, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

(21) Appl. No.: 16/272,311

(22) Filed: Feb. 11, 2019

(65) Prior Publication Data

US 2019/0291685 A1    Sep. 26, 2019

(30) Foreign Application Priority Data

Mar. 20, 2018  (JP) ................................. 2018-053475

(51) Int. Cl.
*B60R 22/20* (2006.01)
*B60R 22/02* (2006.01)

(52) U.S. Cl.
CPC ............ *B60R 22/20* (2013.01); *B60R 22/023* (2013.01); *B60R 2022/207* (2013.01); *B60R 2022/208* (2013.01)

(58) Field of Classification Search
CPC . B60R 22/20; B60R 22/023; B60R 2022/208; B60R 2022/207; B60R 2022/1806; B60R 22/26; B60R 22/46
See application file for complete search history.

(56) References Cited

U.S. PATENT DOCUMENTS

| | | | | |
|---|---|---|---|---|
| 6,164,700 | A * | 12/2000 | Masuda | B60R 22/1955 280/806 |
| 6,497,456 | B1 * | 12/2002 | Masuda | B60R 22/1955 192/223.2 |
| 2002/0135220 | A1 * | 9/2002 | Yamaguchi | B60N 2/42763 297/468 |
| 2003/0030264 | A1 * | 2/2003 | Motozawa | B60R 22/1952 280/806 |
| 2009/0094807 | A1 * | 4/2009 | Sugimoto | B60R 22/03 24/589.1 |
| 2018/0078002 | A1 * | 3/2018 | Murase | A44B 11/2546 |
| 2018/0202523 | A1 * | 7/2018 | Matsuzaki | F16H 25/20 |
| 2018/0345893 | A1 * | 12/2018 | Imanaka | B60R 22/02 |
| 2019/0225185 | A1 * | 7/2019 | Ohno | B60N 2/4221 |

FOREIGN PATENT DOCUMENTS

| | | | |
|---|---|---|---|
| JP | H05-012316 U | | 2/1993 |
| JP | 2005-193846 A | | 7/2005 |
| JP | 2014210482 A | * | 11/2014 |
| JP | 2015-217745 A | | 12/2015 |

* cited by examiner

*Primary Examiner* — Darlene P Condra
(74) *Attorney, Agent, or Firm* — Oliff PLC

(57) ABSTRACT

A vehicle seatbelt device includes: a three-point seatbelt, a tongue having a long hole through which an intermediate portion of the seatbelt is inserted, a buckle that has a buckle main body at which the tongue is anchored and a stay that extends from the buckle main body toward a vehicle lower side and is connected to the vehicle seat, a forward tilting mechanism that tilts the stay toward a seat front side at a time of a vehicle collision or at a time a vehicle collision is predicted, and a shoulder pretensioner that pulls in a shoulder belt of the seatbelt at a time of a vehicle collision, wherein a lower end portion of the buckle main body and an upper end portion of the stay are connected rotatably around an axis along a seat transverse direction.

6 Claims, 6 Drawing Sheets

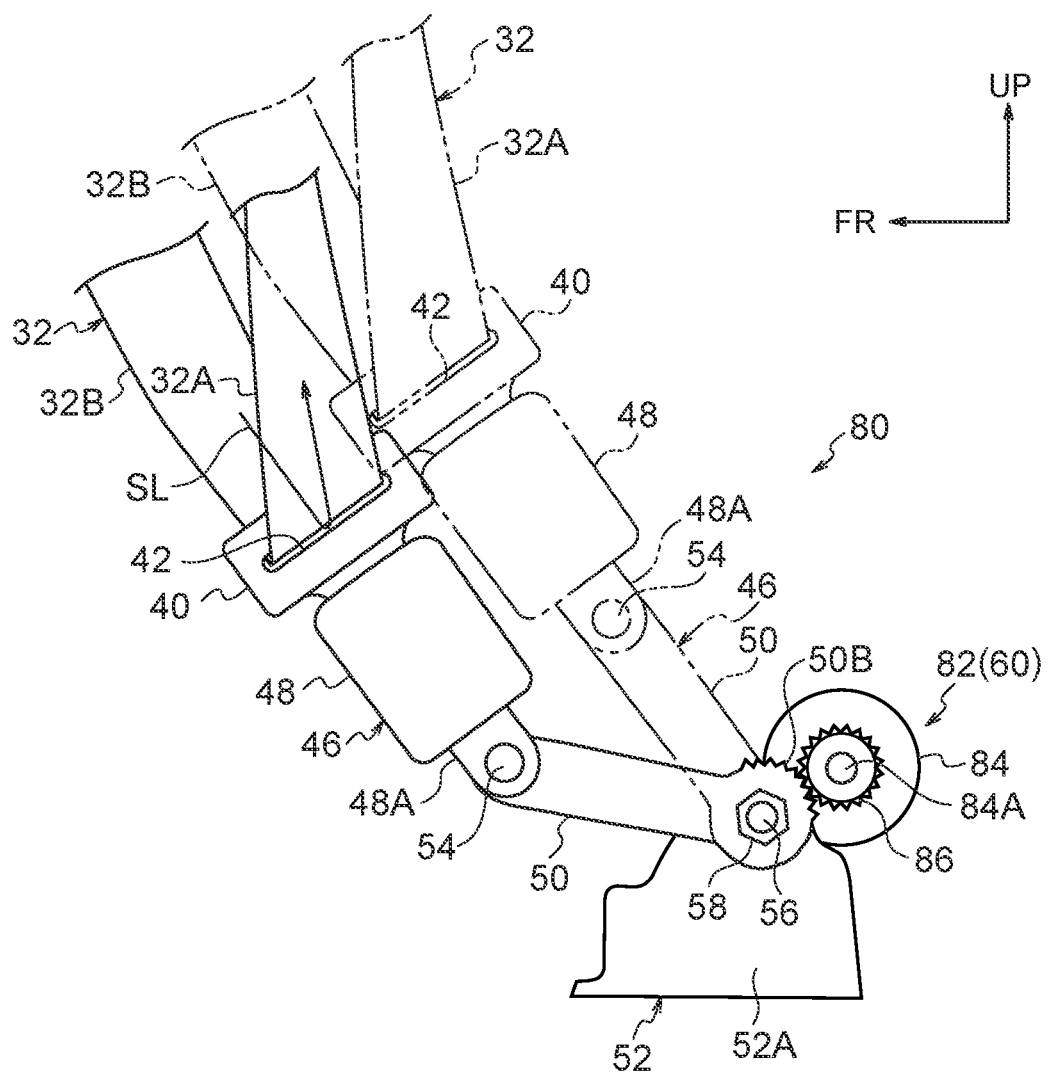

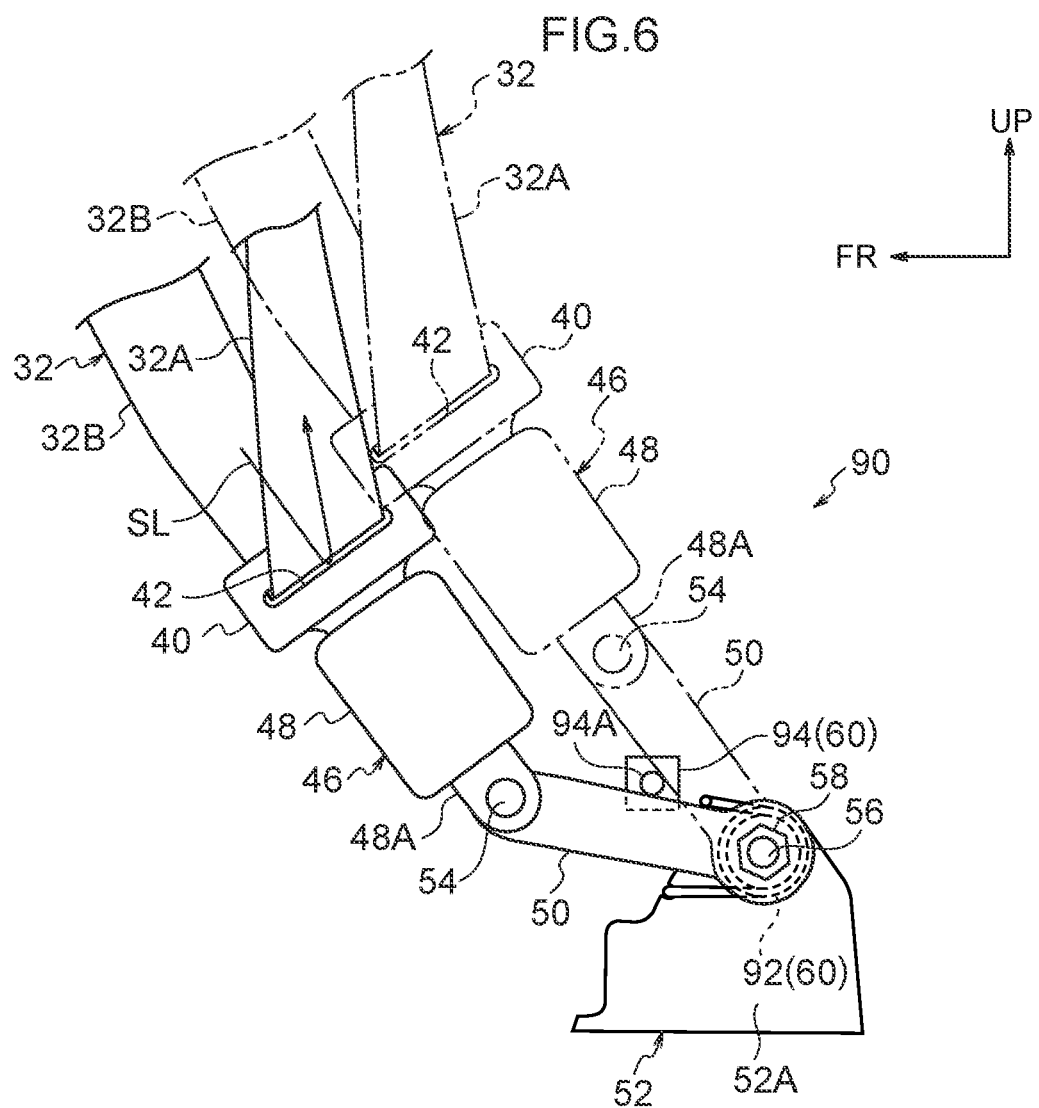

VEHICLE SEATBELT DEVICE

CROSS-REFERENCE TO RELATED APPLICATION

This application is based on and claims priority under 35 USC 119 from Japanese Patent Application No. 2018-053475 filed on Mar. 20, 2018, the disclosure of which is incorporated by reference herein.

BACKGROUND

Technical Field

The present disclosure relates to a vehicle seatbelt device.

Related Art

The vehicle occupant restraining device disclosed in Japanese Patent Application Laid-Open (JP-A) No. 2005-193846 is structured to include a three-point seatbelt device. The seatbelt of this three-point seatbelt device has a shoulder portion belt (a shoulder belt) and a waist region belt (a lap belt). The intermediate portion between the shoulder belt and the lap belt is inserted-through a long hole that is formed in a tongue. Due to the tongue being connected to a buckle that is disposed at a side of a vehicle seat, the shoulder belt restrains the upper half of the body of the vehicle occupant, and the lap belt restrains the waist region of the vehicle occupant. This vehicle occupant restraining device includes a pretensioner that tenses the seatbelt at the time of an emergency, and a pull-down mechanism that pulls the buckle downward at the time of a vehicle collision. Due to the pull-down mechanism rotating (tilting) the buckle toward the vehicle front side, one end portion of the lap belt is pulled downward from the regular position. Due thereto, the angle of the lap belt is actively displaced in a direction that is effective for preventing the submarine phenomenon.

By the way, among pretensioners that are applied to three-point seatbelt devices, there are shoulder pretensioners that, at the time of a vehicle collision, forcibly pull in the shoulder belt toward the opposite side from the tongue. Due to the lap belt moving toward the shoulder belt side due to this pulling-in, not only the tension of the shoulder belt, but also the tension of the lap belt increases. Such a shoulder pretensioner can be applied also to the above-described related art techniques.

However, in the above-described related art techniques, due to the tongue being tilted forward together with the buckle at the time of a vehicle collision, the long hole of the tongue becomes oriented vertically. When the shoulder pretensioner operates in this state, the seatbelt shifts toward one end side (the upper end side) of the long hole, and the frictional force of the seatbelt at the long hole increases. Therefore, the lap belt cannot move smoothly toward the shoulder belt side, and there is the possibility that the performance of the lap belt in restraining the waist region of the vehicle occupant will not be able to be improved sufficiently.

SUMMARY

In view of the above-described circumstances, an object of the present disclosure is to provide a vehicle seatbelt device that, in a structure that tilts a buckle forward at the time of a vehicle collision or at the time a vehicle collision is predicted, can effectively transmit the pulling-in effect of a shoulder pretensioner to a lap belt as well.

A vehicle seatbelt device of a first aspect of the present disclosure includes a three-point seatbelt that restrains a vehicle occupant seated in a vehicle seat, a tongue having a long hole through which an intermediate portion of the seatbelt is inserted, a buckle that is disposed at a side of the vehicle seat, and that has a buckle main body at which the tongue is anchored and a stay that extends from the buckle main body toward a vehicle lower side and is connected to the vehicle seat or to a vehicle body, a forward tilting mechanism that tilts the stay toward a seat front side at a time of a vehicle collision or at a time a vehicle collision is predicted, and a shoulder pretensioner that pulls in a shoulder belt of the seatbelt toward an opposite side from the tongue at a time of a vehicle collision, wherein a lower end portion of the buckle main body and an upper end portion of the stay are connected rotatably around an axis along a seat transverse direction.

In accordance with the first aspect, at the time of a vehicle collision or at the time when a vehicle collision is predicted, due to the forward tilting mechanism tilting the stay of the buckle toward the seat front side, the buckle main body of the buckle is displaced toward the vehicle lower side, and the lap belt of the seatbelt, which is connected to the buckle main body via the tongue, is pulled downward. Due thereto, it is difficult for the lap belt to come away from the waist region (the pelvis) of the vehicle occupant, and the occurrence of the submarine phenomenon is suppressed. Further, at the time of a vehicle collision, the tension of the shoulder belt increases due to the shoulder pretensioner pulling the shoulder belt of the seatbelt toward the opposite side from the tongue.

Here, in the first embodiment, the lower end portion of the buckle main body and the upper end portion of the stay are connected rotatably around an axis along the seat transverse direction. Therefore, at the time when the stay is tilted forward or at the time when the tension of the shoulder belt is increased as described above, the buckle main body is rotated (swung), together with the tongue and with respect to the stay, in the direction in which tension from the seatbelt is applied to the tongue. Due thereto, it can be made such that the seatbelt does not shift toward one end side of the long hole of the tongue. As a result, the lap belt can be moved smoothly toward the shoulder belt side by the tension of the shoulder belt. Therefore, the pulling-in effect of the shoulder pretensioner can be transmitted well to the lap belt as well.

In a vehicle seatbelt device of a second aspect of the present disclosure, in the first aspect, the forward tilting mechanism has a gas actuator that includes a gas generating device and that rotates and drives the stay toward the seat front side around a lower end portion of the stay by using pressure from gas generated by the gas generating device.

In accordance with the second aspect, at the time of a vehicle collision or at the time when a vehicle collision is predicted, gas is generated from the gas generating device that is included in the gas actuator, and the stay of the buckle is rotated and driven toward the seat front side (is tilted forward) around the lower end portion of the stay by the pressure of the gas. By using such a gas actuator, the structure of the forward tilting mechanism can be simplified, and the stay can be tilted forward quickly at a predetermined time.

In a vehicle seatbelt device of a third aspect of the present disclosure, in the first aspect, the forward tilting mechanism has an electric actuator that includes an electric motor and that is configured to rotate and drive the stay in a seat front-rear direction around a lower end portion of the stay by using driving force from the electric motor.

In accordance with the third aspect, at the time of a vehicle collision or at the time when a vehicle collision is predicted, the stay of the buckle is rotated and driven toward the seat front side (is tilted forward) around the lower end portion of the stay by the driving force of the electric motor that is included in the electric actuator. This electric actuator can rotate and drive the stay of the buckle around the lower end portion of the stay also toward the seat rear side by the driving force of the electric motor. Therefore, the stay can be returned to its original position in a case in which a collision of the vehicle is avoided after the stay has been tilted forward, or the like.

In a vehicle seatbelt device of a fourth aspect of the present disclosure, in the first aspect, the forward tilting mechanism has an urging member that urges the stay toward the seat front side around a lower end portion of the stay, and a restricting portion that is configured to assume a restricting state that restricts rotation of the stay toward the seat front side, and a release state that releases the restriction.

In accordance with the fourth aspect, at the time of a vehicle collision or at the time when a vehicle collision is predicted, restricting of swinging, by the restricting portion, of the stay of the buckle is released, and the stay rotates toward the seat front side (is tilted forward) by the urging force of the urging member. The restricting portion is configured to assume the restricting state that restricts the above-described rotation of the stay, and the release state that releases this restriction. Therefore, the stay can be returned to its original position in a case in which a collision of the vehicle is avoided after the stay has been tilted forward, or the like.

In a vehicle seatbelt device of a fifth aspect of the present disclosure, in the first aspect, a lower end portion of the stay is connected to the vehicle seat, the forward tilting mechanism and the shoulder pretensioner are disposed at the vehicle seat, one end portion of the seatbelt is anchored at the vehicle seat, and another end portion of the seatbelt is anchored to a take-up shaft of a retractor that is disposed at the vehicle seat.

In accordance with the fifth aspect, the lower end portion of the stay of the buckle is connected to the vehicle seat. The forward tilting mechanism, the shoulder pretensioner and the retractor are disposed at the vehicle seat. Further, one end portion of the seatbelt is anchored to the vehicle seat, and the other end portion is anchored to the take-up shaft of the retractor. Due thereto, the above-described respective structural elements can move together with the vehicle seat with respect to the vehicle body, and therefore, the seat position can be changed in a wide range. Accordingly, application is possible to, for example, self-driven vehicles in which various seating positions are set as compared with manually-driven vehicles.

As described above, in the vehicle seatbelt device relating to the present disclosure, in a structure that tilts a buckle forward at the time of a vehicle collision or at the time when a vehicle collision is predicted, the pulling-in effect of a shoulder pretensioner can be transmitted effectively to a lap belt as well.

BRIEF DESCRIPTION OF THE DRAWINGS

Exemplary embodiments of the present disclosure will be described in detail based on the following figures, wherein:

FIG. 5 is a side view that corresponds to FIG. 3 and shows the structure at the periphery of a buckle in a vehicle seatbelt device relating to a second embodiment of the present disclosure; and FIG. 6 is a side view that corresponds to FIG. 3 and shows the structure at the periphery of the buckle in a vehicle seatbelt device relating to a third embodiment of the present disclosure.

DETAILED DESCRIPTION

First Embodiment

Figure 1:
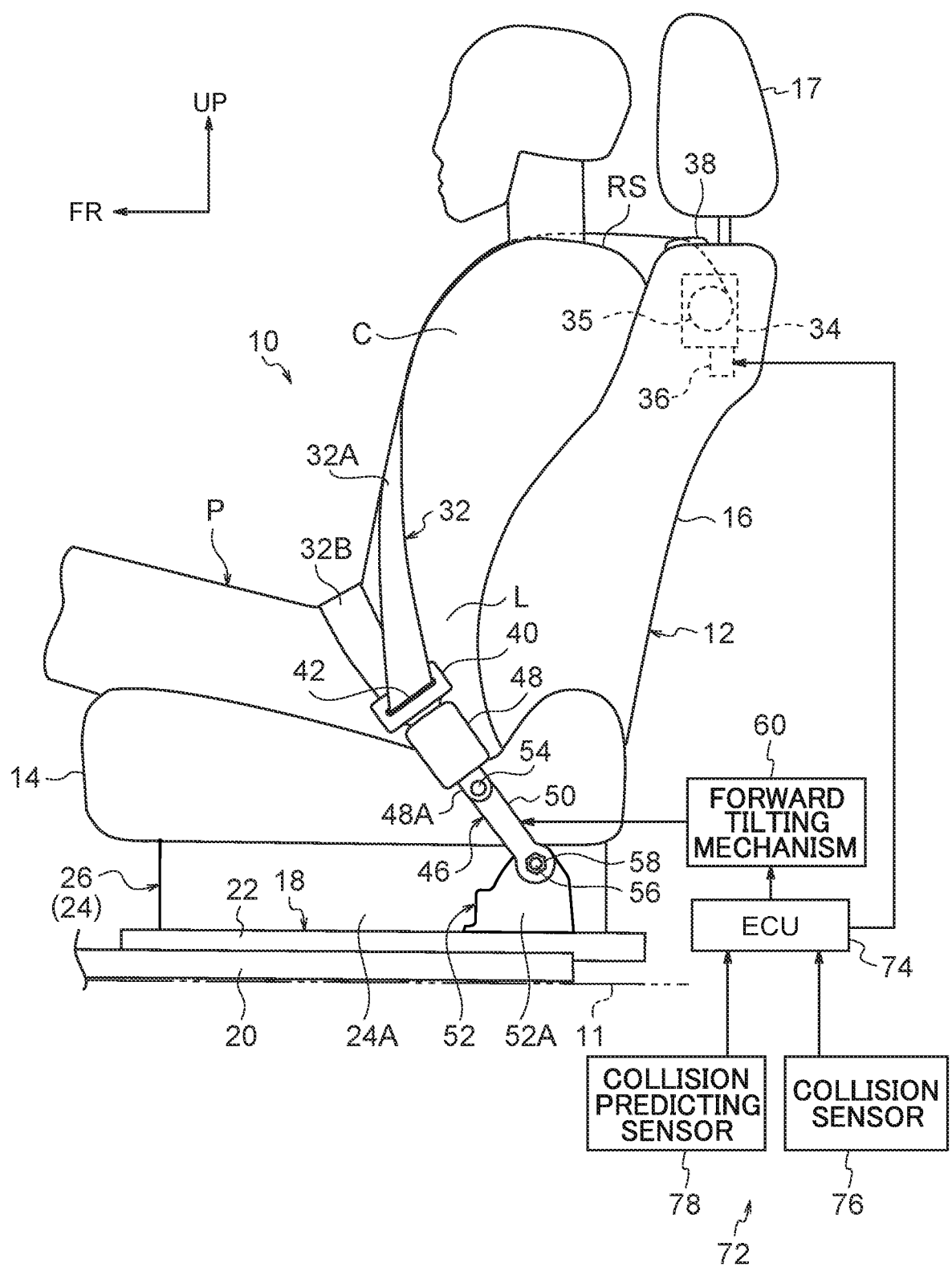
FIG. 1 is a side view showing a state in which a vehicle seatbelt device relating to a first embodiment of the present disclosure is installed in a vehicle, and a vehicle occupant has put on a webbing.
Figure 2:
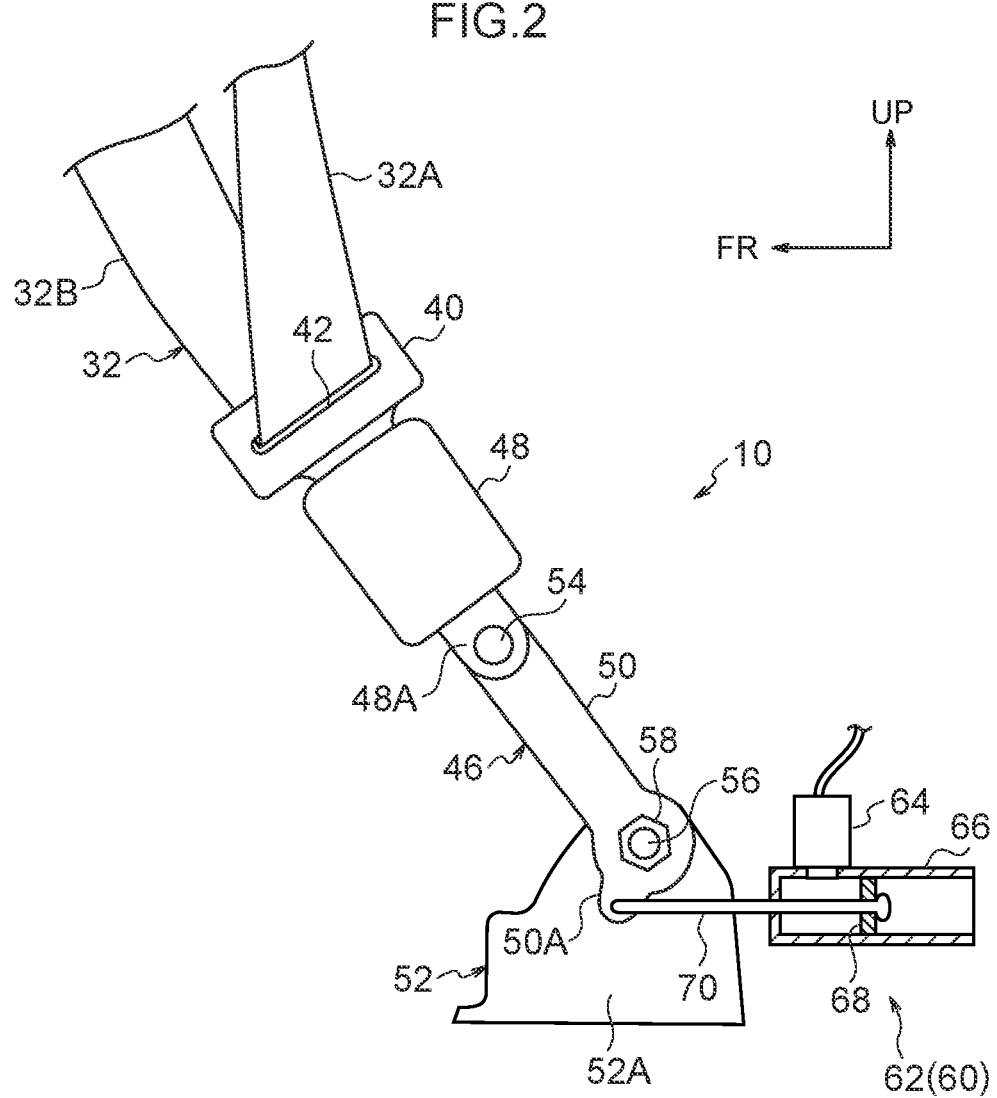
FIG. 2 is an enlarged side view showing a portion of FIG. 1 in an enlarged manner.
Figure 3:
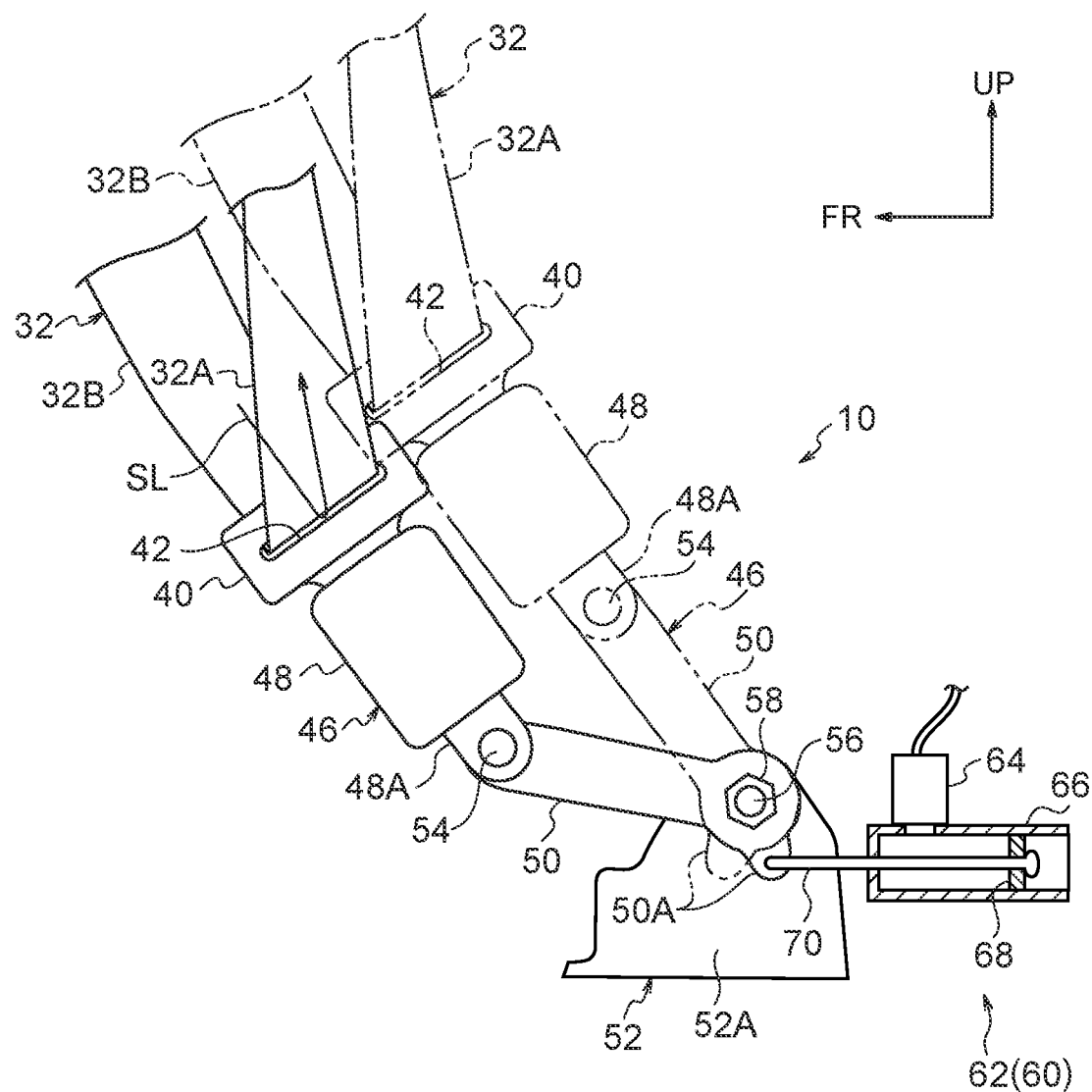
FIG. 3 is a side view that corresponds to FIG. 2 and shows a state in which a stay has been tilted forward.

A vehicle seatbelt device 10 relating to a first embodiment of the present disclosure is described on the basis of FIG. 1 through FIG. 3. Note that arrow FR and arrow UP that are shown appropriately in the respective drawings indicates the vehicle forward side (the vehicle traveling direction) and the vehicle upper side, respectively. Hereinafter, when explanation is given by merely using front-rear and up-down directions, these refer to the front-rear of the vehicle front-rear direction and the up-down of the vehicle up-down direction unless otherwise indicated.

(Structure)

As shown in FIG. 1, the vehicle seatbelt device 10 relating to the present embodiment is a three-point seatbelt device for restraining a vehicle occupant P who is seated in a vehicle seat 12. The vehicle seat 12 is, for example, the driver's seat of a vehicle, and is disposed at the right side of the front portion of a vehicle cabin. The vehicle seat 12 has a seat cushion 14 on which the vehicle occupant P sits, a seatback 16 that is tiltably supported at the rear end portion of the seat cushion 14, and a headrest 17 that is supported at the upper end portion of the seatback 16 such that the height of the headrest 17 is adjustable. The front-rear, left-right and up-down directions of the vehicle seat 12 coincide with the front-rear, left-right and up-down directions of the vehicle. Note that, in a case in which the vehicle seat 12 is disposed at the left side of the front portion of the vehicle cabin, the structure thereof has left-right symmetry with respect to that of the present embodiment.

A pair of left and right slide rails 18 (illustration of the slide rail 18 at the right side is omitted), which are for adjusting the front-rear position of the vehicle seat 12, are disposed beneath the seat cushion 14. Each of the left and right slide rails 18 has a lower rail 20 that is fixed to a vehicle body floor portion 11 via unillustrated brackets, and an upper rail 22 that is supported so as to be able to slide in the vehicle front-rear direction (the seat front-rear direction) with respect to the lower rail 20. The lower rail 20 and the upper rail 22 are formed in elongated shapes whose lengths run along the vehicle front-rear direction.

Left and right risers 26 (illustration of the riser 26 at the right side is omitted) of a cushion frame 24 that is a frame member of the seat cushion 14, are fixed to the top surfaces of the left and right upper rails 22. The left and right risers 26 are formed by, for example, the press-molding of steel plates, and have L-shaped cross-sections as seen in the seat front-rear direction. Each of these risers 26 has a fixed wall, which is not illustrated and is fixed to the top surface of the upper rail 22 by means such as fastening by bolts or the like, and a vertical wall 26A that extends upward from the seat transverse direction inner side end portion of the fixed wall.

As shown in FIG. 1, the vehicle seatbelt device 10 that is applied to the above-described vehicle seat 12 has a three-point seatbelt (webbing) 32, a retractor 34 that has a shoulder pretensioner 36, a tongue 40, a buckle (buckle device) 46, a forward tilting mechanism 60, and a control section 72. The retractor 34 is disposed in the upper portion of the seatback 16. The buckle 46 and the forward tilting mechanism 60 are disposed at a side (here, the left side) of the vehicle seat 12. Note that, in FIG. 1, the forward tilting mechanism 60 is illustrated schematically, and the forward tilting mechanism 60 is structured to include a gas actuator 62 that is shown in FIG. 2 and FIG. 3. The respective aforementioned structural elements are described in detail hereinafter.

An unillustrated one end portion of the seatbelt 32 is anchored on an unillustrated anchor plate that is fixed to the riser 26 or the like at the right side of the vehicle seat 12. The other end portion of the seatbelt 32 is anchored on a take-up shaft 35 of the retractor 34. The retractor 34 is fixed to a frame (not illustrated) of the seatback 16. The retractor 34 has the shoulder pretensioner 36 that, at the time of a vehicle collision, forcibly rotates the take-up shaft 35 in one direction around the axis thereof (a take-up direction of taking-up the seatbelt 32). The shoulder pretensioner 36 is, for example, an explosive-type pretensioner, and is a structure that forcibly takes a predetermined amount of the seatbelt 32 up onto the take-up shaft 35 (pulls the seatbelt 32 into the retractor 34) by rotating the take-up shaft 35 by igniting the explosive. Operation of the shoulder pretensioner 36 is controlled by the control section 72 that is described later.

A belt guide 38, in which an unillustrated long hole (a belt insert-through hole) is formed, is mounted to the upper end portion of the seatback 16. The other end side of the seatbelt 32 is inserted-through the long hole of the belt guide 38. The intermediate portion of the seatbelt 32 is inserted-through a long hole (a belt insert-through hole) 42 that is formed in the tongue 40. Due thereto, the tongue 40 is slidably attached to the intermediate portion of the seatbelt 32. The tongue 40 corresponds to the buckle 46.

As shown in FIG. 1 and FIG. 2, the buckle 46 is disposed at a side (here, the left side) of the seat cushion 14. The buckle 46 has a buckle head (buckle main body) 48 with which the tongue 40 is anchored (connected), a stay (buckle stay) 50 that extends from the buckle head 48 toward the seat lower side (in detail, toward the seat lower side and the seat rear side), and an anchor bracket (anchor member) 52 that connects the lower end portion of the stay 50 to the upper rail 22 that is at the left side.

The buckle head 48 is formed in the shape of a block that is substantially rectangular, and is provided at the upper portion of the buckle 46. A holding mechanism that holds the tongue 40, and a releasing mechanism that releases the holding of the tongue 40 by the holding mechanism, are provided within the buckle head 48. At the buckle head 48, a connecting piece 48A, which is formed from a steel plate for example, extends-out from the end portion (the lower end portion) that is at the side opposite the side to which the tongue 40 is connected. This connecting piece 48A structures the lower end portion of the buckle head 48, and corresponds to the stay 50.

The stay 50 is formed in the shape of an elongated plate by a steel plate for example. An end portion (the upper end portion) of the stay 50 overlaps the connecting piece 48A from the seat transverse direction inner side (here, the right side). The upper end portion of the stay 50 and the connecting piece 48A are connected, so as to be able to rotate relative to one another, by a connecting pin (a hinge shaft) 54 that passes-through the both. This connecting pin 54 is a rivet for example, and is shaped as a solid cylinder whose axial direction runs along the seat transverse direction. Due thereto, the lower end portion of the buckle head 48 and the upper end portion of the stay 50 are connected rotatably around an axis along the seat transverse direction (so as to be able to rotate around the connecting pin 54), and the buckle head 48 can swing in the seat front-rear direction around the lower end portion of the buckle head 48 with respect to the stay 50.

An unillustrated elastic member (e.g., a torsion coil spring) spans between the buckle head 48 and the stay 50. Due thereto, the buckle head 48 is maintained at the neutral position shown in FIG. 2 with respect to the stay 50. When the buckle head 48 is swung (rotated) in the seat front-rear direction with respect to the stay 50, the aforementioned elastic member is elastically deformed. Note that there may be a structure in which a pair of stopper portions, which extend toward the seat front-rear direction both sides of the connecting piece 48A from the upper end portion of the stay 50, are provided, and the range of swinging of the buckle head 48 with respect to the stay 50 is limited by these stopper portions.

The anchor bracket 52 is formed by a steel plate being press-molded for example, and has an L-shaped cross-section as seen in the seat front-rear direction. Concretely, the anchor bracket 52 has an unillustrated fixed wall, which is superposed on the top surface of the rear portion of the fixed wall of the above-described riser 26 and is fixed to that fixed wall and to the upper rail 22 by means such as fastening by bolts or the like, and a vertical wall 52A that extends upward from the seat transverse direction outer side end portion of the fixed wall of the anchor bracket 52. The vertical wall 52A faces the vertical wall 26A of the riser 26 from the seat transverse direction outer side (here, the left side) with a gap therebetween.

The lower end portion of the stay 50 is superposed, from the seat transverse direction outer side, on the upper end portion of the vertical wall 52A. The upper end portion of the vertical wall 52A and the lower end portion of the stay 50 are connected, so as to be able to rotate relatively, by a stepped bolt (connecting shaft) 56, which passes-through the both, and a nut 58 that is screwed-together with the stepped bolt 56. The axial direction of the stepped bolt 56 runs along the seat transverse direction, and the buckle 46 can swing in the seat front-rear direction around the lower end portion of the stay 50 (can rotate around the stepped bolt 56) with respect to the anchor bracket 52. However, inadvertent swinging (rotation) of the stay 50 with respect to the anchor bracket 52 is impeded by the frictional force that works between the stay 50 and the anchor bracket 52.

In the vehicle seatbelt device 10 of the present embodiment, the vehicle occupant P who is seated in the vehicle seat 12 puts-on the seatbelt 32 (the state shown in FIG. 1) by grasping the tongue 40 and engaging the tongue 40 with the upper portion of the buckle head 48 (the upper end portion of the buckle 46). In this state in which the webbing is being worn, the portion, from the belt guide 38 to the tongue 40, of the seatbelt 32 is a shoulder belt 32A that restrains the upper half (a right shoulder portion RS and a chest portion C) of the vehicle occupant P, and the portion, from the tongue 40 to the anchor plate, of the seatbelt 32 is a lap belt 32B that restrains waist region L of the vehicle occupant P.

On the other hand, as shown in FIG. 2 and FIG. 3, the gas actuator 62 that the forward tilting mechanism 60 has is disposed at the seat rear side of the lower end portion of the stay 50. This gas actuator 62 is structured to include a gas generating device 64, and rotates and drives the stay 50 toward the seat front side around the lower end portion thereof by the pressure of the gas generated by the gas generating device 64.

Concretely, the gas actuator 62 has a cylinder 66 that is formed in the shape of a tube having a bottom, and a piston 68 that is disposed at the inner side of the cylinder 66. The cylinder 66 is disposed at an attitude that is such that the axial direction thereof runs along the seat front-rear direction and the bottom wall thereof faces the seat front side. The cylinder 66 is fixed to the riser 26 or the upper rail 22 at the left side via an unillustrated bracket for example. The gas generating device 64 is mounted to the front portion of the cylinder 66. The piston 68 slides toward the seat rear side due to the pressure of the gas that the gas generating device 64 generates within the cylinder 66. A wire 70 that is a connecting member spans between the piston 68 and the lower end portion of the stay 50. The wire 70 is, for example, a wire rope that is flexible.

A projecting piece 50A that projects toward the seat lower side is formed at the lower end portion of the stay 50. One end side of the wire 70 is passed through the projecting piece 50A. The one end portion of the wire 70 is subjected to a retaining treatment such as nipple end processing or the like, which restricts detachment of the wire 70 from the projecting piece 50A. The other end side of the wire 70 is passed through the bottom wall of the cylinder 66 and is inserted through the cylinder 66 interior, and is passed through the central portion of the piston 68. This other end portion of the wire 70 is subjected to a retaining treatment such as nipple end processing or the like, which restricts detachment of the wire 70 from the piston 68. The length dimension of the wire 70 is set such that, in the state in which the stay 50 is positioned at the regular position shown in FIG. 1 and FIG. 2, the wire 70 extends rectilinearly between the projecting piece 50A and the gas actuator 62. For example, a device of a type that combusts a gas generating agent, or a device of a type in which a high-pressure gas is sealed therein, can be used as the gas generating device 64 of the gas actuator 62. Operation of the gas generating device 64 is controlled by the control section 72 that is shown in FIG. 1.

The control section 72 structures a portion of the forward tilting mechanism 60, and has an ECU (Electronic Control Unit) 74 that serves as a control device. This ECU 74 is, for example, mounted to the vehicle body floor portion 11 beneath an unillustrated center console. The above-described shoulder pretensioner 36 and gas generating device 64 are electrically connected to the ECU 74. Further, a collision sensor 76, a collision predicting sensor 78 and an unillustrated buckle switch are electrically connected to the ECU 74.

The collision predicting sensor 78 is, for example, a millimeter wave radar, and is disposed at the front end portion of the vehicle. Before the vehicle front-collides with a collision object, the collision predicting sensor 78 detects the relative velocity of the vehicle and the collision object, and outputs a signal that corresponds to these results of detection to the ECU 74. Note that the collision predicting sensor 78 is not limited to a millimeter wave radar, and may be a laser radar, a stereo camera, or the like. The collision sensor 76 is, for example, an acceleration sensor, and is disposed at the front portion of the vehicle. At the time of a front collision of the vehicle, the collision sensor 76 detects the acceleration of the vehicle, and outputs a signal corresponding to these results of detection to the ECU 74. Note that, other than symmetric collisions (a front collision, a full overlap front collision), asymmetric collisions such as an oblique collision, a small overlap collision and the like are included among the aforementioned front collisions. The buckle switch is disposed at the buckle head 48, and outputs an on signal to the ECU 74 in a state in which the tongue 40 is anchored in the buckle head 48, i.e., a state in which the vehicle occupant P is wearing the seatbelt 32.

The ECU 74 executes a control program that is stored in a ROM, in a state in which the ignition switch of the vehicle is on and an on signal is being outputted from the buckle switch. In this control program, when, on the basis of the output from the collision predicting sensor 78, the ECU 74 judges that a front collision of the vehicle is inevitable (i.e., at the time a vehicle collision is predicted), the ECU 74 supplies operating electric current to the gas generating device 64. Then, when, on the basis of the output from the collision sensor 76, the ECU 74 senses a front collision the vehicle (i.e., at the time of a vehicle collision), the ECU 74 supplies operating electric current to the shoulder pretensioner 36. Namely, in the present embodiment, the ECU 74 is structured to operate (activate) the gas generating device 64 before operating (activating) the shoulder pretensioner 36.

When the gas generating device 64 operates, the gas generated from the gas generating device 64 is supplied into the cylinder 66, and the piston 68 slides toward the seat rear side due to the pressure of this gas. Due thereto, the projecting piece 50A of the stay 50 that is connected to the piston 68 via the wire 70 is pulled toward the seat rear side, and the stay 50 is rotated and driven toward the seat front side around the lower end portion thereof (around the stepped bolt 56). Due thereto, the stay 50 is swung from the regular position shown by the two-dot chain line in FIG. 3 to the forwardly tilted position shown by the solid line in FIG. 3.

Further, when the shoulder pretensioner 36 operates, the take-up shaft 35 of the retractor 34 is forcibly rotated in the direction of taking-up the seatbelt 32, and a predetermined amount of the seatbelt 32 is taken-up onto the take-up shaft 35. Due thereto, the shoulder belt 32A is pulled-in toward the opposite side (here, the belt guide 38 side) from the tongue 40, and the tension of the shoulder belt 32A increases.

Note that, in the present embodiment, because the lower end portion of the stay 50 is connected to the piston 68 via the wire 70, the range of swinging of the stay 50 with respect to the anchor bracket 52 is limited at usual times, but the buckle head 48 can swing around the connecting pin 54 with respect to the stay 50. Due thereto, the operability at the time when the vehicle occupant P anchors the tongue 40 with the buckle head 48 is ensured.

(Operation and Effects)

Operation and effects of the present embodiment are described next.

In the vehicle seatbelt device 10 of the above-described structure, when the ECU 74 judges, on the basis of the output from the collision predicting sensor 78, that a front collision of the vehicle is inevitable, the ECU 74 operates the gas generating device 64 of the gas actuator 62. Due thereto, the stay 50 of the buckle 46 is rotated and driven toward the seat front side (is tilted forward) around the lower end portion of the stay 50 due to the pressure of the gas generated from the gas generating device 64. As a result, the buckle head 48 of the buckle 46 is displaced toward the vehicle lower side, and the lap belt 32B of the seatbelt 32, which is connected to the buckle head 48 via the tongue 40, is pulled downward. Due thereto, it is difficult for the lap belt 32B to come away from the waist region L (the pelvis) of the vehicle occupant P, and the occurrence of the submarine phenomenon is suppressed. Further, when the ECU 74 senses a front collision of the vehicle on the basis of the output from the collision sensor 76, the ECU 74 operates the shoulder pretensioner 36. Due thereto, the shoulder belt 32A of the seatbelt 32 is pulled-in toward the opposite side from the tongue 40, and the tension of the shoulder belt 32A increases.

Here, in the present embodiment, the lower end portion of the buckle head 48 and the upper end portion of the stay 50 are connected so as to be rotatable around an axis that runs along the seat transverse direction. Therefore, at the time when the stay 50 is tilted forward or at the time when the tension of the shoulder belt 32A is increased as described above, the buckle head 48 rotates (swings) together with the tongue 40 and with respect to the stay 50 in the direction (toward the seat upper side) in which tension is applied from the seatbelt 32 to the tongue 40. Due thereto, it can be made such that the seatbelt 32 does not shift toward one end side of the long hole 42 of the tongue 40. As a result, the lap belt 32B can be moved (slid) smoothly toward the shoulder belt 32A side by the tension of the shoulder belt 32A (refer to arrow SL in FIG. 3). Therefore, the pulling-in effect of the shoulder pretensioner 36 can be transmitted well to the lap belt 32B as well.

Figure 4:
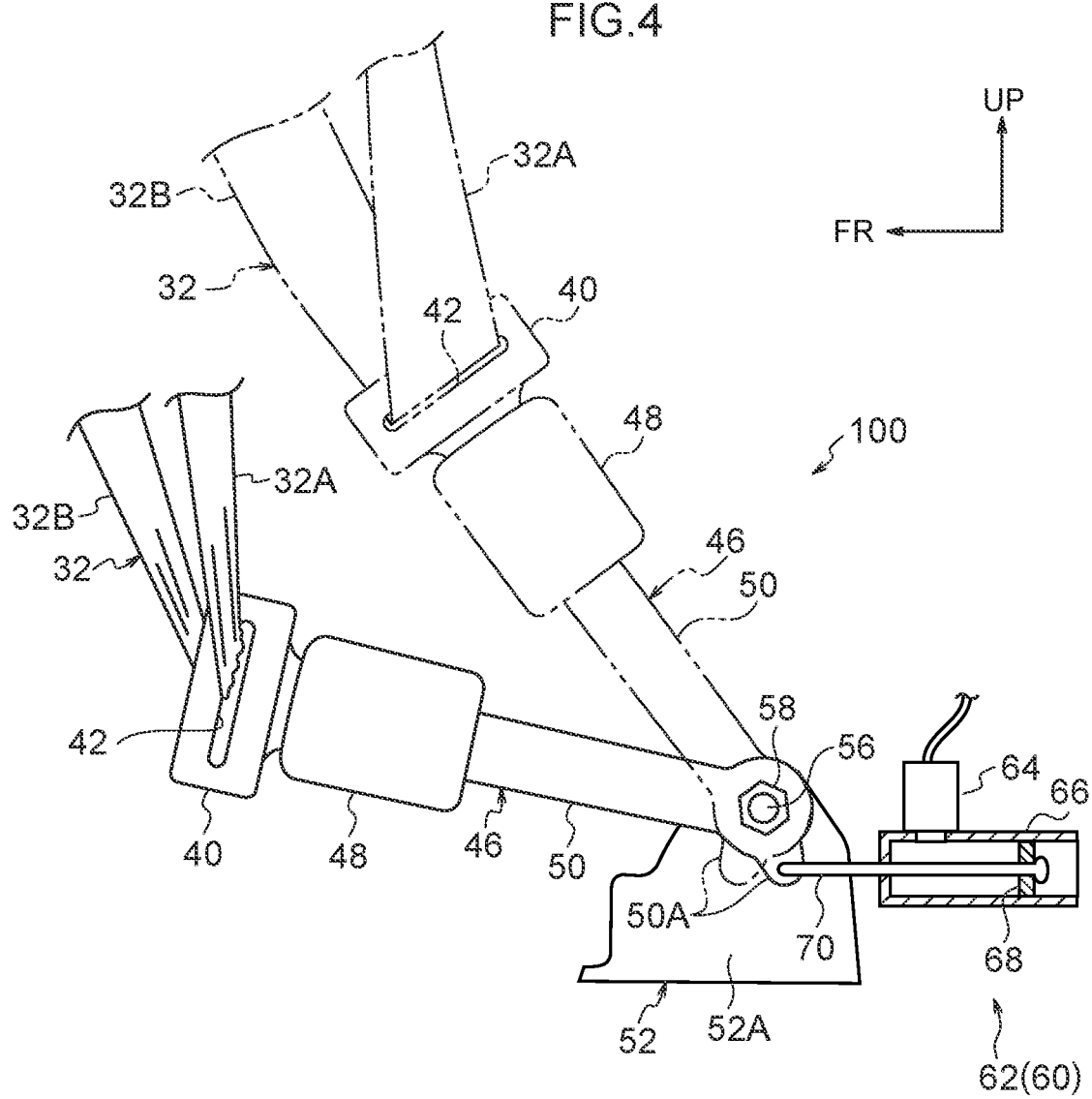
FIG. 4 is a side view that corresponds to FIG. 3 and shows a comparative example.

Supplementary explanation of the above-described effects is given by using comparative example 100 that is shown in FIG. 4. In this comparative example 100, the buckle head 48 is fixed so as to be unable to rotate (so as to be unable to swing) with respect to the stay 50, but structures other than these are similar to those of the present embodiment. Note that, in FIG. 4, the same reference numerals are applied to structures that are similar to those of the present embodiment. In this comparative example 100, due to the tongue 40 being tilted forward together with the buckle 46 at the time of a vehicle collision, the long hole 42 of the tongue 40 is oriented vertically. When the shoulder pretensioner 36 (not illustrated in FIG. 4) operates in this state, the seatbelt 32 shifts toward end side (the upper end side) of the long hole 42, and the frictional force of the seatbelt 32 at the long hole 42 becomes large. Therefore, the lap belt 32B cannot move smoothly toward the shoulder belt 32A side, and the performance of restraining the waist region L by the lap belt 32B is not improved sufficiently. In contrast, in the present embodiment, the seatbelt 32 is prevented from shifting toward one end side of the long hole 42, and therefore, the pulling-in effect of the shoulder pretensioner 36 is transmitted well to the lap belt 32B as well, and the performance of restraining the waist region L by the lap belt 32B improves sufficiently.

Further, in the present embodiment, the gas generating device 64 is operated before the operation of the shoulder pretensioner 36. Therefore, in the state in which the stay 50 is tilted forward and it has become difficult for the lap belt 32B to come away from the waist region L (the pelvis) of the vehicle occupant P, the tensions of the shoulder belt 32A and the lap belt 32B are increased, and therefore, the vehicle occupant restraining performance of the shoulder belt 32A and the lap belt 32B can be improved well.

Moreover, in the present embodiment, the forward tilting mechanism 60 has the gas actuator 62 that rotates and drives the stay 50 toward the seat front side around the lower end portion thereof, due to the pressure of the gas generated by the gas generating device 64. By using this gas actuator 62, the structure of the forward tilting mechanism 60 can be simplified, and the stay 50 can be tilted forward quickly at a predetermined (a desired) time.

In the present embodiment, the lower end portion of the stay 50 of the buckle 46 is connected to the upper rail 22 of the vehicle seat 12 via the anchor bracket 52. The forward tilting mechanism 60, the shoulder pretensioner 36 and the retractor 34 are disposed at the vehicle seat 12. Further, one end portion of the seatbelt 32 is anchored on the vehicle seat 12 via the anchor plate, and the other end portion is anchored on the take-up shaft 35 of the retractor 34. Due thereto, the above-described respective structural elements can be moved together with the vehicle seat 12 with respect to the vehicle body, and therefore, the seat position can be changed within a wide range. Accordingly, the present vehicle seatbelt device 10 can be applied to, for example, self-driven vehicles in which various seating positions are set as compared with manually-driven vehicles. Namely, for example, even in a case in which the front-rear sliding range of the vehicle seat 12 with respect to the vehicle body floor portion 11 is set to be large, or even in a case in which the vehicle seat 12 can be rotated around an axis that is orthogonal to the vehicle body floor portion 11, the vehicle occupant P can be restrained appropriately by the vehicle seatbelt device 10 that is disposed at the vehicle seat 12.

Other embodiments of the present disclosure are described next. Note that structures and operations that are basically similar to those of the first embodiment are denoted by the same reference numerals as in the first embodiment, and description thereof is omitted.

Second Embodiment

The structure at the periphery of the buckle 46 of a vehicle seatbelt device 80 relating to a second embodiment of the present disclosure is shown in FIG. 5 in a side view that corresponds to FIG. 3. In this embodiment, the forward tilting mechanism 60 has an electric actuator 82 instead of the gas actuator 62 relating to the first embodiment. The electric actuator 82 is structured to include an electric motor 84. The electric motor 84 is, for example, a motor with a deceleration gear. Rotation of a rotor is decelerated by a deceleration gear (neither of which is illustrated), and this is transmitted to an output shaft 84A. The electric motor 84 is disposed at the seat rear side of the lower end portion of the stay 50 in an attitude that is such that the output shaft 84A runs along the seat transverse direction. This electric motor 84 is fixed to the riser 26 or the upper rail 22 at the left side via an unillustrated bracket for example.

A spur gear 86 is fixed to the output shaft 84A of the electric motor 84. This gear 86 is meshed-together with a spur gear 50B that is formed at the lower end portion of the stay 50. Due thereto, at the electric actuator 82, the stay 50 can be rotated and driven in the seat front-rear direction around the lower end portion thereof by the driving force of the electric motor 84. Concretely, the electric actuator 82 is structured to rotate and drive the stay 50 between the regular position shown by the two-dot chain line in FIG. 5, and the forwardly tilted position shown by the solid line in FIG. 5. Further, at usual times, the electric motor 84 maintains the stay 50 at the position shown by the two-dot chain line in FIG. 5.

The above-described electric motor 84 is electrically connected to the ECU 74 of the control section 72. The ECU 74 operates the electric motor 84 when the ECU 74 judges, on the basis of the output from the collision predicting sensor 78, that a front collision of the vehicle is inevitable (i.e., at the time when a vehicle collision is predicted). Note that the time at which the ECU 74 operates the electric motor 84 is set to be slightly earlier than the time at which the ECU 74 operates the gas generating device 64 relating to the first embodiment. In the present embodiment, structures other than these are similar to those of the first embodiment.

In accordance with this embodiment, at the time a vehicle collision is predicted, the stay 50 of the buckle 46 is rotated and driven toward the seat front side (is tilted forward) around the lower end portion of the stay 50 by the driving force of the electric motor 84 that the electric actuator 82 has. In this embodiment as well, operation and effects that are basically similar to those of the first embodiment are obtained. Moreover, the above-described electric actuator 82 can rotate and drive the stay 50 of the buckle around the lower end portion of the stay 50 toward the seat rear side as well by the driving force of the electric motor 84. Therefore, in a case in which a collision of the vehicle is avoided after the stay 50 has been tilted forward (a case in which forward tilting of the stay 50 is unnecessary) or the like, the stay 50 can be returned to its original position (the regular position shown by the two-dot chain line in FIG. 5).

Third Embodiment

The structure at the periphery of the buckle 46 of a vehicle seatbelt device 90 relating to a third embodiment of the present disclosure is shown in FIG. 6 in a side view that corresponds to FIG. 3. In this embodiment, the forward tilting mechanism 60 has, instead of the gas actuator 62 relating to the first embodiment, a torsion coil spring 92 that serves as an urging member, and a solenoid 94 that serves as a restricting portion. The torsion coil spring 92 is supported coaxially with respect to the stepped bolt 56. One end portion of the torsion coil spring 92 is engaged with the stay 50, and the other end portion is engaged with the vertical wall 52A of the anchor bracket 52. The torsion coil spring 92 urges the stay 50 toward the seat front side.

The solenoid is a pull-type solenoid, and is disposed at the seat front side and the seat upper side of the anchor bracket 52 in an attitude that is such that the axial direction of a plunger 94A runs along the seat transverse direction. Concretely, the solenoid 94 is disposed at a position at which the plunger 94A abuts, from the seat front side, the stay 50 that is positioned at the regular position (refer to the stay 50 shown by the two-dot chain line in FIG. 6), and at a position at which the plunger 94A abuts, from the seat upper side, the stay 50 that is positioned at the forwardly tilted position (refer to the stay 50 shown by the solid line in FIG. 6). The solenoid 94 is fixed to the riser 26 or the upper rail 22 that is at the left side via an unillustrated bracket for example. At usual times, the solenoid 94 maintains the stay 50 at the regular position (restricts rotation of the stay 50 toward the seat front side) by the plunger 94A. Further, due to the solenoid 94 being energized, the solenoid 94 withdraws the plunger 84A and releases the aforementioned restricting of rotation. Namely, the solenoid 94 is structured so as to be able to assume a restricting state in which the solenoid 94 restricts rotation (swinging) of the stay 50 toward the seat front side, and a release state in which the solenoid 94 releases the aforementioned restriction.

The solenoid 94 is electrically connected to the ECU 74 of the control section 72. When, on the basis of the output from the collision predicting sensor 78, the ECU 74 judges that a front collision of the vehicle is inevitable (i.e., at the time when a vehicle collision is predicted), the ECU 74 operates the solenoid 94 (starts supplying power to the solenoid 94). Due thereto, the plunger 94A of the solenoid 94 withdraws, and the holding of (the restricting of the rotation of) the stay 50 by the plunger 94A is released. Due thereto, the stay 50 rotates to the forwardly tilted position by the urging force of the torsion coil spring 92.

Further, after a preset period of time has elapsed from the operation of the solenoid 94 by the ECU 74 (i.e., immediately after the forward tilting of the stay 50 is completed), the ECU 74 cuts-off the supply of electricity to the solenoid 94. Due thereto, the plunger 94A of the solenoid 94 projects-out and abuts, from the seat upper side, the stay 50 that is positioned at the forwardly tilted position. Due thereto, rotation of the stay 50 from the forwardly tilted position to the regular position is restricted. In this embodiment, structures other than those described above are similar to those of the first embodiment.

In accordance with this embodiment, at the time when a vehicle collision is predicted, restriction of rotation of the stay 50 of the buckle 46 by the solenoid 94 is released, and the stay 50 swings toward the seat front side (is tilted forward) by the urging force of the torsion coil spring 92. In this embodiment as well, operation and effects that are basically similar to those of the first embodiment are obtained. Moreover, the solenoid 94 can selectively be set in a restricting state, in which the solenoid 94 restricts rotation of the stay 50 further toward the seat front side than the regular position, and a release state, in which the solenoid 94 releases the above-described restricting. Therefore, the stay 50 can be returned to its original position in a case in which a collision of the vehicle is avoided after the stay 50 has been tilted forward, or the like.

Supplemental Description of Embodiments

The above-described first embodiment is structured such that the gas generating device 64 is operated before the operation of the shoulder pretensioner 36. However, the present disclosure is not limited to this, and may be structured such that the shoulder pretensioner 36 and the gas generating device 64 are operated simultaneously (at the time of a vehicle collision). Similarly, the above-described third embodiment as well may be structured such that the shoulder pretensioner 36 and the solenoid 94 are operated simultaneously.

The above-described second embodiment describes a case in which the electric actuator 82 is structured to include the electric motor 84 with a deceleration gear, but the present disclosure is not limited to this. It suffices for the electric actuator to include an electric motor, and the electric actuator may be, for example, a linear actuator or a feed-screw type actuator.

Further, in the above-described third embodiment, there is a structure in which the torsion coil spring 92 is made to be the urging member and the solenoid 94 is made to be the restricting portion. However, the present disclosure is not limited to this. It suffices for the urging member to be a structure that can urge the stay toward the seat front side. For example, the urging member may be a compression coil spring, a tension coil spring, or the like. Further, it suffices for the restricting portion to be a portion that can assume a restricting state of restricting rotation of the stay toward the seat front side, and a release state of releasing this restricting, and the restricting portion may be, for example, an actuator that includes an electric motor.

The above-described respective embodiments are structured such that one end portion of the seatbelt 32 is anchored to the vehicle seat 12 via an anchor plate, and the other end portion of the seatbelt 32 is anchored on the take-up shaft 35 of the retractor 34 that is disposed at the seatback 16. However, the present disclosure is not limited to this. Namely, there may be a structure in which, for example, one end portion of the seatbelt 32 is anchored at the vehicle body floor portion 11 via an anchor plate, and the other end portion of the seatbelt 32 is anchored on the take-up shaft 35 of the retractor 34 that is disposed at the lower portion of a center pillar. In this case, there is a structure in which the intermediate portion of the seatbelt 32 is trained around a shoulder anchor that is mounted to the upper portion of the center pillar, and the shoulder pretensioner 36 pulls in the shoulder belt 32A toward the aforementioned shoulder anchor side.

Further, although the above-described respective embodiments are structured such that the stay 50 of the buckle 46 is connected to the upper rail 22 (the vehicle seat 12) via the anchor bracket 52, the present disclosure is not limited to this. Namely, there may be a structure in which, for example, the stay 50 of the buckle 46 is connected to the vehicle body floor portion 11 via a bracket such as the anchor bracket 52 or the like.

Further, although the above-described respective embodiments are structured such that the shoulder pretensioner 36 is provided at the retractor 34, the present disclosure is not limited to this, and there may be a structure in which the shoulder pretensioner is provided separately from the retractor.

In addition, the present disclosure can be embodied by being modified in various ways within a scope that does not depart from the gist thereof. Further, the scope of the present disclosure is, of course, not limited to the above-described respective embodiments.

What is claimed is:

1. A vehicle seatbelt device, comprising:
   a three-point seatbelt that restrains a vehicle occupant seated in a vehicle seat;
   a tongue having a long hole through which an intermediate portion of the seatbelt is inserted;
   a buckle that is disposed at a side of the vehicle seat, and that has a buckle main body at which the tongue is anchored and a stay that extends from the buckle main body toward a vehicle lower side and is connected to the vehicle seat or to a vehicle body;
   a forward tilting mechanism that tilts the stay toward a seat front side at a time of a vehicle collision or at a time that a vehicle collision is predicted; and
   a shoulder pretensioner that pulls in a shoulder belt of the seatbelt toward an opposite side from the tongue at a time of the vehicle collision, wherein
   a lower end portion of the buckle main body and an upper end portion of the stay are connected rotatably around an axis along a seat transverse direction, and
   the forward tilting mechanism comprises:
      an urging member that urges the stay toward the seat front side around a lower end portion of the stay, and
      a restricting portion that is configured to assume (i) a restricting state that restricts rotation of the stay toward the seat front side, and (ii) a release state that releases the restriction.

2. The vehicle seatbelt device of claim 1, wherein:
   the lower end portion of the stay is connected to the vehicle seat,
   the forward tilting mechanism and the shoulder pretensioner are disposed at the vehicle seat,
   one end portion of the seatbelt is anchored at the vehicle seat, and
   another end portion of the seatbelt is anchored to a take-up shaft of a retractor that is disposed at the vehicle seat.

3. The vehicle seatbelt device of claim 1, wherein the restricting portion is a solenoid.

4. The vehicle seatbelt device of claim 3, wherein:
   at usual times, the solenoid is not energized and is set in the restricting state,
   at the time when the vehicle collision is predicted, the solenoid is energized and is set in the release state, and
   after the forward tilting of the stay is completed, the solenoid is not energized and is set in the restricting state.

5. The vehicle seatbelt device of claim 1, wherein the forward tilting mechanism has a control device that operates the forward tilting mechanism before operation of the shoulder pretensioner.

6. The vehicle seatbelt device of claim 1, wherein:
   at usual times, the restricting portion is set in the restricting state in which the restricting portion restricts rotation of the stay toward the seat front side,
   at the time when the vehicle collision is predicted, the restricting portion is set in the release state in which the restricting portion releases the restriction, and
   after the forward tilting of the stay is completed, the restricting portion is set in the restricting state.

* * * * *